United States Patent [19]
Howarth

[11] 3,793,524
[45] Feb. 19, 1974

[54] APPARATUS FOR MEASURING A CHARACTERISTIC OF SHEET MATERIALS

[75] Inventor: John J. Howarth, San Jose, Calif.

[73] Assignee: Measurex Corporation, Cupertino, Calif.

[22] Filed: Sept. 5, 1972

[21] Appl. No.: 286,053

Related U.S. Application Data

[63] Continuation-in-part of Ser. No. 140,762, May 6, 1971, abandoned.

[52] U.S. Cl.............. 250/339, 250/218, 356/210
[51] Int. Cl. ........................................ G01n 21/26
[58] Field of Search..... 250/83.3 R, 83.3 D, 83.3 H, 250/218, 219 DF, 43.5 D; 356/201, 202, 239, 209, 210

[56] References Cited
UNITED STATES PATENTS

| | | | |
|---|---|---|---|
| 1,848,874 | 3/1932 | Fitzgerald | 356/201 |
| 2,474,828 | 7/1949 | Connelly | 356/201 |
| 3,594,087 | 7/1971 | Miranda | 250/219 FR |
| 3,281,597 | 10/1966 | Greenberg | 250/83.3 D |
| 3,675,019 | 7/1972 | Hill | 250/83.3 D |
| 3,478,210 | 11/1969 | Janacek | 250/83.3 D |
| 3,551,678 | 12/1970 | Mitchell | 250/83.3 H |
| 3,475,615 | 10/1969 | Samuel | 250/219 DF |
| 3,518,001 | 6/1970 | Hell | 356/201 |
| 3,524,066 | 8/1970 | Blakkan | 356/180 |
| 3,641,349 | 2/1972 | Dahlin | 250/83.3 D |

OTHER PUBLICATIONS

"The Detection and Measurement of Infrared Radiation," 1958, by R. A. Smith et al., pp. 4,328–4,330.

Primary Examiner—James W. Lawrence
Assistant Examiner—D. C. Nelms
Attorney, Agent, or Firm—Flehr, Hohbach, Test, Albritton & Herbert

[57] ABSTRACT

Apparatus for measuring the moisture content of sheet material such as paper includes an infrared radiation source and detector. These are coupled to apertures in opposed paperguide plates through which the paper material flows. The apertures may be offset from one another and in conjunction with reflective coatings, of both the specular and non-specular type, on the paperguides provides simultaneous random multiple paper contacts for a typical infrared ray in its travel between the source and detector. This has the effect of increasing the effective thickness of paper, especially fine or tissue paper. For heavy paper, the foregoing technique causes radiation to be driven through to provide more accurate measurements. Diffusing windows at the radiation source and detector in addition to providing multiple radiation paths provide other advantages.

27 Claims, 9 Drawing Figures

PATENTED FEB 19 1974
3,793,524
SHEET 1 OF 3
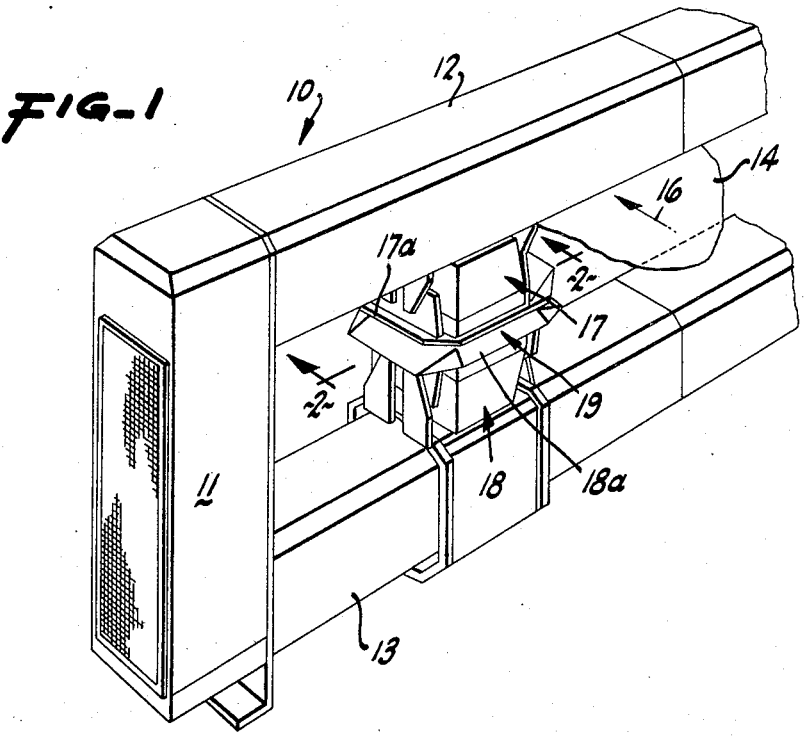
FIG-1
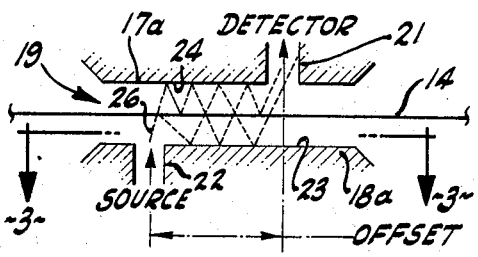
FIG-2
FIG-3
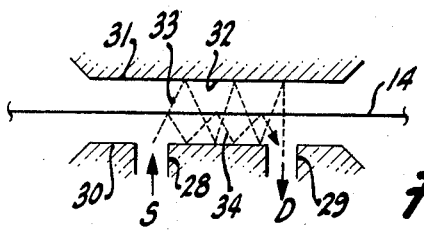
FIG-4
INVENTOR.
JOHN J. HOWARTH
BY
Flehr, Hohbach, Test,
Albritton & Herbert
ATTORNEYS

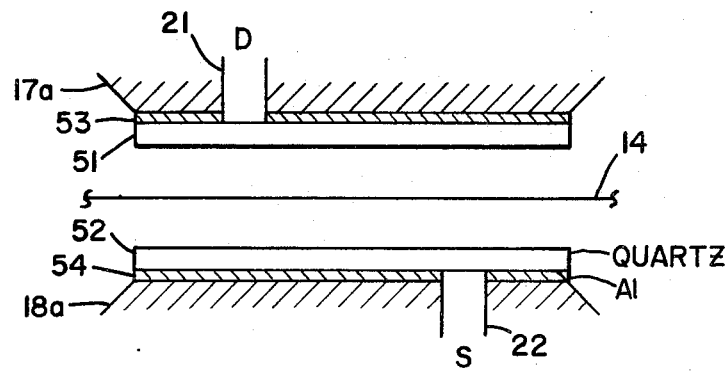
FIG_7
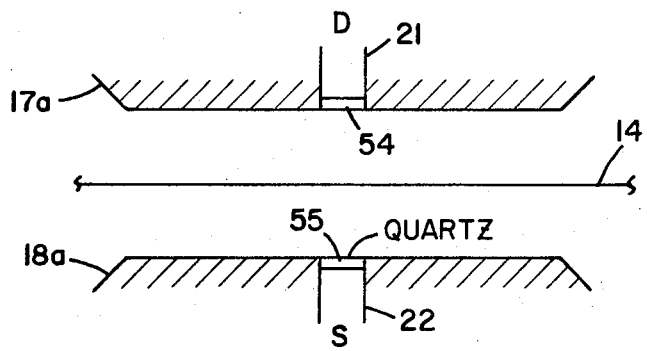
FIG_8
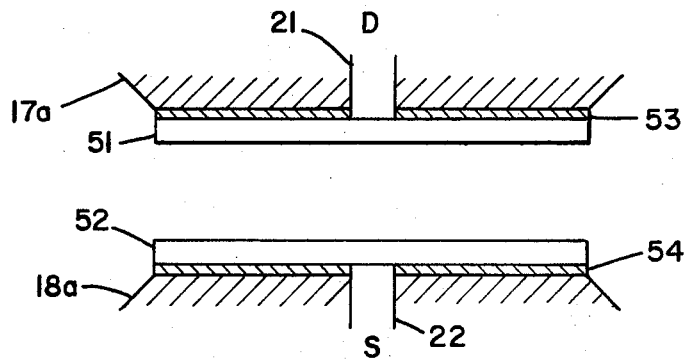
FIG_9

3,793,524

APPARATUS FOR MEASURING A CHARACTERISTIC OF SHEET MATERIALS

CROSS-REFERENCE TO RELATED APPLICATION

This application is a continuation-in-part of copending application Ser. No. 140,762 filed May 6, 1971, in the name of John J. Howarth and assigned to the present assignee and now abandoned.

BACKGROUND OF THE INVENTION

The present invention is directed to apparatus for measuring a characteristic of sheet material and more particularly for measuring the moisture content or water weight of relatively thin paper or relatively thick paper. It is also applicable to the measurement of other sheet material characteristics such as composition.

Moisture gauges for measuring the moisture content of sheet material such as paper being manufactured by a paper making machine are well known in the art. Normally the gauge includes an infrared radiation source that emits radiation in two spectral bands. The reference band of, for example, 1.7 microns impinges on the paper and the amount of transmission through the paper or reflected from the paper is a function of certain parameters of the paper. It is known that in the case of a spectral band encompassing 1.7 microns that this wavelength region is relatively insensitive to the moisture content of the paper. However, the radiation source also produces radiation in the spectral band including 1.94 microns which lies within the absorption band of the water or moisture contained by the paper. Thus, the amount of infrared light or radiation that passes through or is reflected at a wavelength of 1.94 microns is a function of both the paper and the amount of water in the paper.

The specific details of a moisture gauge using the foregoing technique are disclosed more fully in a copending application in the name of Erik B. Dahlin, entitled "Apparatus For Measuring The Amount of Substance That Is Associated With A Base Material And Method Therefor," Ser. No. 861,588 filed Sept. 29, 1969, and now U.S. Pat. No. 3,641,349 issued Feb. 8, 1972.

Although prior moisture gauges provided accurate measurements of water weight for heavier gauge paper, it has been almost impossible to measure on-line water weight in light weight paper such as tissues. The only feasible technique has been to off-line measure a sample in the laboratory. This technique obviously does not provide close control of the water content of the paper during the manufacturing process. Measurement of extremely heavy grades of paper has also been difficult due to the relative impenetrability to radiation of the paper.

Since a paper making machine is limited in production speed by its dryer capacity, it may be desirable to limit water weight to a minimum. On the other hand, some types of paper are more economically produced with a maximum water weight.

Other problems with measurement of moisture includes the sensitivity of measuring apparatus to differing grades of paper. The above copending Dahlin patent provides one solution to this problem. Also, the measurement is affected by the fiber preparation of the paper. For example, the chemical or mechanical milling of fiber affects present measurement techniques.

OBJECTS AND SUMMARY OF THE INVENTION

It is, therefore, a general object of the present invention to provide an improved apparatus for measuring a characteristic of sheet material.

It is another object of the invention to provide apparatus as above which is highly sensitive to the moisture content of light-weight sheet materials.

It is another object of the invention to provide apparatus as above which is insensitive to varying basis weights and fiber preparations in the measurement of moisture content.

It is another object of the invention to provide apparatus as above which is highly sensitive to the moisture content of extremely heavy sheet materials.

It is another object of the invention to provide apparatus as above in which the standardization procedure is simplified.

It is another object of the invention to provide for a high accuracy of measurement of the moisture content of both light and heavy sheet materials.

It is another object of the invention as above which is relatively insensitive to surface coatings on a sheet material when measuring its moisture content.

In accordance with the above objects, there is provided apparatus for measuring a predetermined characteristic of a translucent sheet material comprising a radiation source for directing radiation towards the material, a radiation detector for detecting radiation from the source after attenuation and diffusion by the translucent material, and means for reflecting at least a portion of radiation from the source towards the sheet material.

The invention also provides diffusing means interposed between the source and detector for causing radiation to impinge upon the material in a multitude of simultaneous random paths.

BRIEF DESCRIPTION OF THE DRAWINGS

FIG. 1 is a partial perspective view of apparatus for measuring the water weight of paper which embodies the present invention;

FIG. 2 is a simplified cross-sectional view taken along the line 2—2 of FIG. 1;

FIG. 3 is a cross-sectional view taken along the line 2—3 of FIG. 2;

FIG. 4 is an alternative embodiment of FIG. 2;

FIG. 8 is an alternative embodiment of FIG. 2; and

FIG. 9 is an alternative embodiment of FIG. 8.

DETAILED DESCRIPTION OF THE PREFERRED EMBODIMENT

Figure 5:
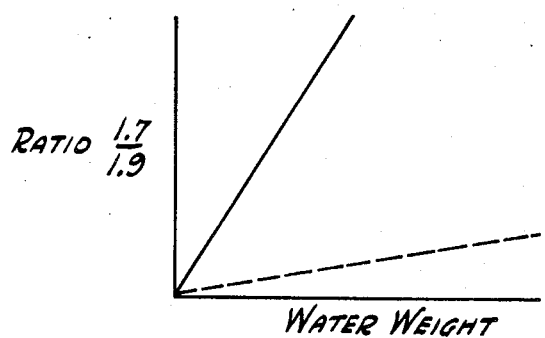
FIGS. 5 and 6 are graphs illustrating the improvement of the invention over the prior art.

As disclosed in the above-mentioned copending Dahlin patent, a characteristic of a sheet material being manufactured by a paper making machine can be measured by mounting a radiation detector and a radiation source on a carriage. The carriage scans in a cross direction while the sheet is moving in a machine or perpendicular direction to the cross direction.

FIG. 1 illustrates a scanner 10 which includes a framework 11 having a pair of spaced upper and lower parallel beams 12, 13 which extend laterally of the sheet material or paper indicated at 14. Paper 14 travels through scanner 10 in the direction shown by arrow 16. Upper and lower gauging heads 17, 18 are provided on the framework 11 and travel longitudinally of the framework and transversely of the paper sheet 14.

Specifically, paper sheet 14 travels through a gap 19 formed by paper guides 17a and 18a. The lower gauging head 18 contains a radiation source which emits radiation that impinges upon the paper 14. The intensity of this radiation after it has been attenuated by paper 14 is sensed by a radiation detector which is included in gauging head 17.

The foregoing is schematically illustrated in FIG. 2 where the planar paper guide 17a includes an aperture 21 coupled to a detector and planar paper guide 18a includes an aperture 22 coupled to a radiation source. When moisture content or water weight of paper is being measured an infrared source would be used which includes the wavelengths 1.7 microns and 1.94 microns.

As discussed above, the use of these frequencies in the measurement of moisture content of paper is well known in the art. A radiation source and detector and their accompanying apertures 21 and 22 are offset from one another in the manner so indicated in the direction of the parallel planar guides 17a, 18a.

Each of the guides 17a and 18a includes a reflective coating upon its planar surface for reflecting the radiation from the radiation source. This is indicated in FIG. 3 where guide 18a includes a reflective coating 23, and concomitantly guide 17a has a reflective coating 24. Such coating is preferably very hard, highly reflective and highly polished. This provides an easily cleaned surface for some uses, the surfaces of the paper guides 17a and 18a may be anodized aluminum. In many cases a non-specular reflecting surface may be advantageously used as will be discussed below. For example, the reflector could consist of a mirror surface with a layer of translucent quartz or glass ceramic. Finally, the surfaces need not be planar and parallel. The foregoing does provide optical characteristics which are easily manipulated. However, the shape of the surfaces may be disked or highly irregular. Any reflective surface which acts to return the radiation from the source to the paper is suitable.

Radiation from the source reaches the detector by a somewhat complex set of paths 26, partially illustrated by the dashed lines. Radiation initially impinges on paper 14 part of the radiation passing through and part being reflected by the paper. Surfaces 23 and 24 again reflect this radiation back to the paper where it undergoes the same process of partial transmission and reflection. In addition, the paper itself, being translucent, acts to diffuse the radiation to increase the number of paths.

The mean number of times the radiation passes through the paper on its path from the source to the detector can be easily controlled by adjusting the geometry of apparatus. In this manner the paper can be made to appear as thick as described.

It has been found that sensitivity to moisture increases up to a specified paper or basis weight; above this critical value it remains essentially constant. Thus, to provide for insensitivity to basis weight, a paper wwight is simulated which is heavier than the critical value.

FIG. 5 illustrates the relationship between water weight and the infrared radiation ratio. The solid line shows the relatively great sensitivity achieved by the present invention where, by the use of the surfaces 23 and 24 and the offsetting of the source and detector, the radiation is caused to follow multiple simultaneous random paths crossing through the paper 14 many times to provide the greater sensitivity as illustrated in FIG. 5. The greater slope of the solid line compared to the dashed line indicates the amount of greater sensitivity. The dashed line of FIG. 5 represents a typical prior art characteristic where the apparatus will detect only relatively gross changes in water weight. This relatively insensitive dashed line characteristic is produced in the normal moisture measuring apparatus, under conditions of thin sheet material such as tissue, since the great amount of radiation from the source passes through the sheet material only once on route to the aligned detector (as opposed to being offset). Thus, the radiation is not sufficiently attenuated or affected by such sheet material.

The final ratio provided by the detector as an indication of water weight is, of course, standardized and calibrated to provide the actual water weight of the material. Such standardization and calibration is fully disclosed in the above-mentioned patent. However, it briefly involves the use of filters which simulate a known moisture content to periodically update the calibration.

Figure 6:
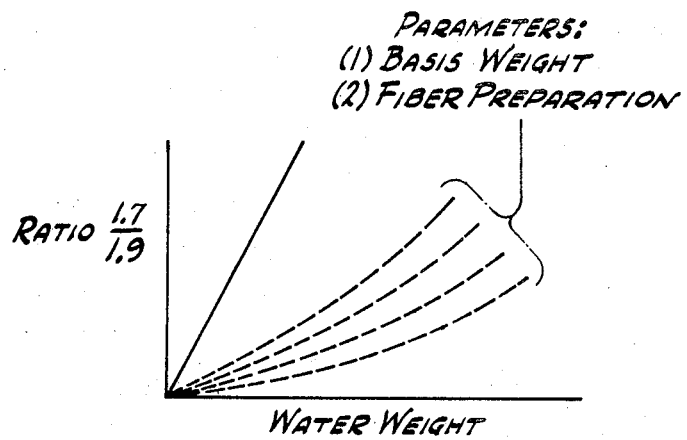

The technique of the present invention in addition to overcoming difficulties imposed by the thickness of the sheet material, desensitizes the measuring apparatus to other parameters of the sheet material being measured such as its basis weight, fiber preparation, or fiber size (hardwood versus softwood). This is illustrated in FIG. 6 where the solid line again is the characteristic provided by the present invention of water weight versus the received ratio of 1.7 and 1.94 micron radiation. The dashed curves illustrated prior art techniques where either the basis weight of the paper or the fiber preparation acts as a parameter to cause an erroneous result unless taken into accout. Thus, the present invention is also advantageous in the measurement of the thicker materials where heretofore when moisture content was being measured basis weight was a parameter in these measurements. In the present invention the basis weight parameter is eliminated. The same is true of fiber types where, for example, whether the pulp originated from chemical or mechanical milling or from hard or softwood would normally affect the mositure measurement. Referring to FIG. 2 again it has been found that both the offset distance between the source and detector and the gap width 19 between the sheet guides are relatively insensitive providing the critical enhancement with respect to effective paper weight has been surpassed. Preferred distances, for most papers, are 2 inches with a ½-inch gap.

FIG. 4 illustrates two alternative embodiments for the source and detector designated S and D which are coupled to apertures 28 and 29 respectively in a paper guide 30. The apertures, however, are on the same side of the sheet material 14 as compared to the opposed sides as in FIG. 2. An offset is still provided. If a reflecting paper guide 31 is provided as illustrated with a reflecting surface 32, radiation ray paths 33 are provided where they cross and recross through paper 14 to be both scattered and absorbed in the same manner as discussed in conjunction with the embodiment of FIG. 2. However, in some instances, particularly with extremely heavy papers, the reflecting surface 32 may be eliminated and only a single reflecting surface on guide 30 provided. A resulting ray path 34 is illustrated where one of the reflective characteristics of paper 14 is used to indicate the characteristic being measured rather than the transmission characteristic of the paper. It is, of course, well known that a characteristic can be measured in accordance with Beer's law by transmission of radiation through it or reflection of radiation from it in any type of material, sheet or otherwise.

Thus, the present invention contemplates reflecting radiation which has been attenuated or absorbed by sheet material 14 either by transmission through it or reflection from it so that in any case the radiation ray or path is subject to multiple random contact with the sheet material.

The foregoing concept of the invention can also be applied to the measurement of other bulk characteristics of sheet material such as chemical composition.

Figure 7:
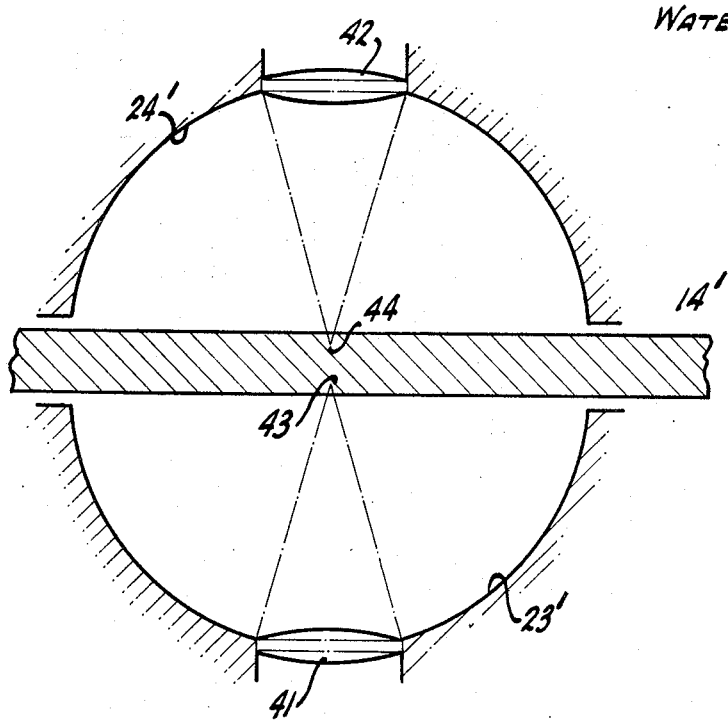
FIG. 7 is an alternative embodiment of FIG. 2.

As discussed above, in certain applications a non-specular reflecting surface on the paper guides 17a and 18a enhances the simultaneous random radiation paths to provide for even greater sensitivity. Specifically, as shown in FIG. 7, paper guides 17a and 18a having offset apertures 21 and 22 with a detector and source respectively coupled thereto and two sheets of translucent material 51 and 52 respectively affixed to the paper guides. Sheets 51 and 52 are preferably of a translucent quartz type material which is available for example under the trademark VITREOSIL and manufactured by the Thermal American Fused Quartz Company of Montville, N.J. The material acts as a very effective diffuser. Sheets 51 and 52 may also include an aluminum reflective backing 53 and 54 to enhance reflection sensitivity at all places on the sheet except at the apertures 21 and 22. Thus, radiation from source 22 is diffused by the quartz layer 52 providing simultaneous multiple radiation paths and which after passing through paper 14 (which in itself acts as a diffusing medium since it is translucent) is reflected and diffused even more so by the diffusing layer 51 with its aluminized backing 53.

The embodiment of FIG. 7 is especially useful for measurements with light papers, for example, from 1 to 2 pounds per thousand square feet. The offset between the source and detector is approximately 2 inches.

On the other hand, the embodiments of FIGS. 8 and 10 are more suitable for measurement of heavy paper of, for example, 100 pounds per thousand square feet. Here in these embodiments, the apertures 21 and 22 are not offset but are aligned. Moreover, in FIG. 8 the apertures which are coupled, of course, to the source and detector units include quartz windows or plates 54 and 55. This arrangement provides good sensitivity to moisture measurements even though the heavier paper material 14 provides significantly greater diffusion than a light paper since the diffusion windows or plates 54 and 55 minimize any change in sensitivity of the moisture measurement due to their diffusion capability. At the same time, the alignment of the source and detector with each other allows for a significantly greater amount of radiation to be transmitted from the source to the detector as opposed to the offset arrangement of FIG. 7. The added reflective layers of FIG. 9 provide increased efficiency.

Although in FIGS. 7, 8 and 9 diffusing windows or mediums have been provided at both the source and detector, it is believed that a single window would be suitable particularly for heavy paper. However, it is also believed that the use of a symmetrical arrangement with diffusing means both at the source and detector provides a symmetry which has the advantage of reducing sensitivity of the measurement apparatus to the flutter of the paper 14.

For good efficiency it is also important to place the diffusing windows or plate in close enough proximity to the sheet material so that radiation is in effect trapped and moves back and forth to provide the random paths.

Another advantage of the embodiments of FIGS. 7 – 9 and especially that of FIG. 9 is that in stardardization, where it is desired to calibrate the measuring device, no standard representing dry paper is required. In other words, the paper 14 may be merely removed from the gap and the standardization measurement made at that time since the diffusing windows themselves serve as a "dry" standard. These embodiments also provide decreased sensitivity to surface coating since, as is also true in the case of heavy paper, the added diffusion capability of the surface coating is nullified due to the diffusion windows. Yet another advantage is that extremely efficient optical sources may be used. This is because radiation need only reach the diffusing window to be useful whereas in prior designs the need for a well defined beam limited efficiency.

Some of the advantages of the present invention can be explained from a theoretical standpoint by analogizing a sheet of paper to a haystack in magnified form. The paper consists of layers of fibers where light passing through these layers is randomly reflected. The foregoing paper model is actually simulated by the pair of diffusing windows or sheets used in the present invention. This is because the light which is trapped between them is reflected back and forth in a random manner.

Thus, it is apparent that a pair of diffusing plates or sheets forms a sample or optical cell which has the same optical characteristics as dry paper. Moreover, if by proper spacing of the translucent diffusing plates and provision of an offset (in some cases) between the source and detector, the sample cell will exhibit the characteristics of heavy dry paper.

The foregoing has the effect of reducing the sensitivity of the measuring system of the present invention to basis weight, fiber type, coatings and additives. In other words, since the sample cell simulates relatively heavy paper the introduction of a relatively light sheet of wet paper will not appreciably change the effective thickness of the overall combination; that is, the combination of the introduced sample and the simulated paper thickness. Thus the radiation used for measuring water weight as in the present invention sees only the change in water content and is relatively unaffected by basis weight. More importantly by simulating a thicker paper a sensitivity of measurement of water content of light papers is obtained previously obtained only in the measurement of heavy paper.

Since as discussed above the main optical path length of the apparent simulated paper thickness of the sample cell may be determined by the separation of the translucent diffusing plates and the offset between the source and detector, the optical cell can in effect be tuned to provide for optimum measurements for a certain paper range. More specifically, the tuning provides a simulated paper thickness which is much greater than the actual paper sample thickness.

In the case of extremely heavy papers it may not be possible to provide the above insensitivity to basis weight since optical efficiency or linearity must be preserved. Therefore, it is not possible to simulate the relatively much heavier paper thickness.

From another standpoint it is also apparent that instead of a pair of diffusing windows or sheets that one of the diffusing windows can be replaced by heavy paper which acts as a diffuser itself.

I claim:

1. Apparatus for measuring the moisture content of a sheet of material having substantial radiation diffusing and absorbing properties, said apparatus including means defining a path for said sheet material and comprising: a radiation source positioned on one side of said path and emitting one spectral band of radiation that is relatively sensitive to absorption by water and another spectral band that is relative insensitive to absorption by water, both of said bands being sensitive to absorption and diffusion by said sheet material; a radiation detector adjacent said path for receiving a portion of said radiation after it has impinged upon sheet material in said path and for converting said received radiation to an electrical signal; and means positioned with respect to said source, detector, and path and cooperating with said sheet material to cause substantial and repeated diffusion including reflection of substantially all of said radiation as it travels from said source to said detector to prevent direct transmission of any substantial amount of radiation from said source to said detector whereby said electrical signal is proportional to the moisture and whereby said moisture measurement is substantially independent of fluctuations in diffusion or absorption by said sheet material.

2. Apparatus as in claim 1 where said source and detector are located on opposite sides of said path and where said means cooperating with said sheet material includes a pair of translucent sheets composed of diffusing material, one of said sheets being positioned between said source and said path and the other of said sheets being positioned between said detector and said path.

3. Apparatus as in claim 2 where said source and detector have respective axes of radiation and detection which are colinear.

4. Apparatus as in claim 2 where said source and detector have respective axes of radiation and detection which are laterally offset from one another with respect to said path.

5. Apparatus as in claim 2 where said sheets have a reflective backing except in proximity to said source and detector.

6. Apparatus as in claim 2 where said means defining a path for said sheet material includes a pair of substantially parallel plates each having an aperture therein said apertures being respectively coupled to said radiation source and detector, said translucent sheets being respectively coextensive with said apertures.

7. Apparatus as in claim 1 where said means defining a path for said sheet material includes at least one plate substantially parallel to said path and where said means cooperating with said sheet material includes a specular reflecting surface on the side of said plate adjacent said path.

8. Apparatus as in claim 1 where said means defining a path for said sheet material includes at least one plate substantially parallel to said path and where said means cooperating with said sheet material includes a non-specular reflecting surface on the side of said plate adjacent said path.

9. Apparatus as in claim 7 where said plate includes a pair of apertures respectively coupled to said radiation source and detector.

10. Apparatus as in claim 8 where said plate includes a pair of apertures respectively coupled to said radiation source and detector.

11. Apparatus as in claim 1 where said means defining a path for said sheet material includes a pair of substantially parallel plates such plates being located on opposite sides of and substantially parallel to said path each having an aperture therein said apertures being respectively coupled to said radiation source and detector, and where said means cooperating with said sheet material includes specular reflecting surfaces on the side of said plates adjacent said path and where source and detector are laterally offset from one another with respect to said path.

12. Apparatus as in claim 1 where said means defining a path for said sheet material includes a pair of substantially parallel plates such plates being located on opposite sides of and substantially parallel to said path each having an aperture therein said apertures being respectively coupled to said radiation source and detector, and where said means cooperating with said sheet material includes non-specular reflecting surfaces on the side of said plates adjacent said path and where said source and detector are laterally offset from one another with respect to said path.

13. Apparatus as in claim 1 where said sheet material is paper.

14. Apparatus as in claim 13 where said one spectral band of radiation sensitive to water is centered around 1.94 microns and said other band is centered around 1.7 microns.

15. Apparatus for measuring the moisture content of a sheet material having substantial radiation diffusing and absorbing properties, said apparatus including means defining a path for said sheet material comprising: a radiation source positioned on one side of said path and emitting one spectral band of radiation that is relatively sensitive to absorption by water and another spectral band that is relatively insensitive to absorption by water, both of said bands being sensitive to absorption and diffusion by said sheet; a radiation detector adjacent said path for receiving a portion of said radiation after it has impinged upon sheet material in said path and for converting said received radiation to an electrical signal; and means positioned with respect to said source, detector, and path and cooperating with said sheet material to cause substantial and repeated diffusion including reflection of substantially all of said radiation as it travels from said source to said detector to prevent direct transmission of any substantial amount of radiation from said source to said detector whereby said electrical signal is proportional to the moisture and whereby said moisture measurement is substantially independent of fluctuations in diffusion or absorption by said sheet material, said means comprising radiation diffusing material adjacent said path in a position to intercept all radiation travelling from said source to said detector.

16. Apparatus as in claim 15 where said path defining means comprises spaced members having surfaces between which said sheet is passed.

17. Apparatus as in claim 16 where said spaced members include apertures to which said source and detector are coupled.

18. Apparatus as in claim 17 where said radiation diffusing material is contiguous to at least one of said surfaces and covers at least one of said apertures.

19. Apparatus as in claim 18 where said source and detector are coupled to apertures on opposite sides of said path of said sheet material.

20. Apparatus as in claim 19 where said source aperture is laterally offset from said detector aperture with respect to said path.

21. Apparatus as in claim 19 where said source and detector apertures are aligned.

22. Apparatus as in claim 21 where said radiation diffusing material is coextensive with said source and detector apertures.

23. Apparatus as in claim 18 where said radiation diffusing material consists of translucent quartz having a reflective backing except at said apertures.

24. Apparatus as in claim 15 where said sheet material is paper.

25. Apparatus as in claim 24 where said one spectral band of radiation sensitive to water is centered around 1.94 microns and said other band is centered around 1.7 microns.

26. In a method for measuring the moisture content of a sheet of material of which the basis weight varies randomly and has an unknown moisture content by the use of a source and detector with the source providing first and second spectral bands of radiation with the radiation being of the type so that at least a portion of each of the spectral bands is absorbed and diffused by the sheet material regardless of the moisture content of the sheet material and said radiation also being of the type so that moisture in said sheet material will cause substantially more of the radiation from one of said spectral bands of radiation to be absorbed than from the other spectral band of radiation, said method comprising moving the sheet material along a path, causing radiation in both of said spectral bands coming from said source on one side of the path to strike one side of said sheet material, using the detector adjacent the path for receiving a portion of the radiation from both of said spectral bands after the radiation from both the spectral bands has impinged upon the sheet material in said path and for converting the received radiation to an electrical signal, causing substantial and repeated diffusion including reflection of substantially all of the radiation from both of said spectral bands striking said one side of said sheet material prior to receiving portions thereof by the detector and preventing direct transmission of any substantial amount of radiation from the source to the detector whereby the electrical signal is proportional to the moisture and whereby the moisture measurement is substantially independent of fluctuations in diffusion or absorption by said sheet material.

27. A method as in claim 26 together with the step utilizing a ratio of the radiation in one of said spectral bands in comparison to the radiation in the other spectral band to ascertain the moisture content in the sheet of material to provide a measurement thereof which is relatively insensitive to the basis weight of the sheet of material.

\* \* \* \* \*

UNITED STATES PATENT OFFICE
CERTIFICATE OF CORRECTION

Patent No. 3,793,524      Dated February 19, 1974

Inventor(s) John J. Howarth

It is certified that error appears in the above-identified patent and that said Letters Patent are hereby corrected as shown below:

Sheet 2 of the drawings delete Figure 7.

Signed and sealed this 16th day of July 1974.

(SEAL)
Attest:

McCOY M. GIBSON, JR.
Attesting Officer

C. MARSHALL DANN
Commissioner of Patents